(12) United States Patent
Olivik et al.

(10) Patent No.: US 9,001,532 B2
(45) Date of Patent: Apr. 7, 2015

(54) METHOD OF FORMING A SYNCHRONOUS RECTIFIER CONTROLLER AND STRUCTURE THEREFOR

(71) Applicants: Lukas Olivik, Loukov (CS); Roman Stuler, Karolinka (CS); Tomas Tichy, Jihlava (CS)

(72) Inventors: Lukas Olivik, Loukov (CS); Roman Stuler, Karolinka (CS); Tomas Tichy, Jihlava (CS)

(73) Assignee: Semiconductor Components Industries, LLC, Phoenix, AZ (US)

( * ) Notice: Subject to any disclaimer, the term of this patent is extended or adjusted under 35 U.S.C. 154(b) by 228 days.

(21) Appl. No.: 13/737,081

(22) Filed: Jan. 9, 2013

(65) Prior Publication Data

US 2014/0192575 A1 Jul. 10, 2014

(51) Int. Cl.
H02M 3/335 (2006.01)

(52) U.S. Cl.
CPC ........ H02M 3/33592 (2013.01); Y02B 70/1475 (2013.01)

(58) Field of Classification Search
USPC .................. 363/18, 21.04, 21.06, 21.1, 21.12, 363/21.14, 21.17, 21.18, 89
See application file for complete search history.

(56) References Cited

U.S. PATENT DOCUMENTS

| 7,385,832 B2 * | 6/2008 | Allinder ..................... 363/21.14 |
| 8,134,851 B2 * | 3/2012 | Soldano et al. ............... 363/127 |
| 8,415,687 B2 * | 4/2013 | Kim et al. ...................... 257/87 |

OTHER PUBLICATIONS

On Semiconductor, NCP4303A, NCP4303B Secondary Side Synchronous Rectification Driver for High Efficiency SMPS Topologies, Semiconductor Components Industries, LLC 2011, htpp:\\onsemi.com.
International Rectifier, IR11672AS Advanced Smart Rectifier Control IC, International Rectifier 2009-2011, www.irf.com.

* cited by examiner

Primary Examiner — Nguyen Tran
(74) Attorney, Agent, or Firm — Robert F. Hightower (57) ABSTRACT

In one embodiment, a synchronous rectifier controller is configured to initiate forming an off-time interval for a first period of time responsively to the controller forming a disable state of a switching signal wherein the control circuit maintains the switching signal in the disable state for at least the off-time interval. The controller is also configured to restart forming the off-time interval responsively to a voltage of a synchronous rectifier becoming a first value prior to expiration of the first period of time.

20 Claims, 6 Drawing Sheets

METHOD OF FORMING A SYNCHRONOUS RECTIFIER CONTROLLER AND STRUCTURE THEREFOR

BACKGROUND OF THE INVENTION

The present invention relates, in general, to electronics, and more particularly, to semiconductors, structures thereof, and methods of forming semiconductor devices.

In the past, synchronous rectifiers were used to improve the efficiency of switching power supplies. The synchronous rectifier typically was enabled to assist in discharging an inductor used in the switching power supply. The subsequent disabling of the synchronous rectifier often resulted in multiple voltage transitions at the node to which the synchronous rectifier was connected. These multiple voltage transitions often were referred to as ringing. In some applications, the ringing could cause the synchronous rectifier to be incorrectly re-enabled during the ringing which resulted in inefficient operation of the switching power supply. In some applications, a blanking interval was formed when the synchronous rectifier was disabled and was used to ignore transitions that occur during the blanking interval. Often, the synchronous rectifier was still re-enabled subsequent to the blanking interval thereby still resulting in inefficient operation.

Accordingly, it is desirable to have a synchronous rectifier controller that results in efficient operation even during multiple voltage transitions, that minimizes the effect of the multiple voltage transitions, and that improves operation of the synchronous rectifier.

For simplicity and clarity of the illustration(s), elements in the figures are not necessarily to scale, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type of N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten per cent (10%) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

DETAILED DESCRIPTION OF THE DRAWINGS

Figure 1:
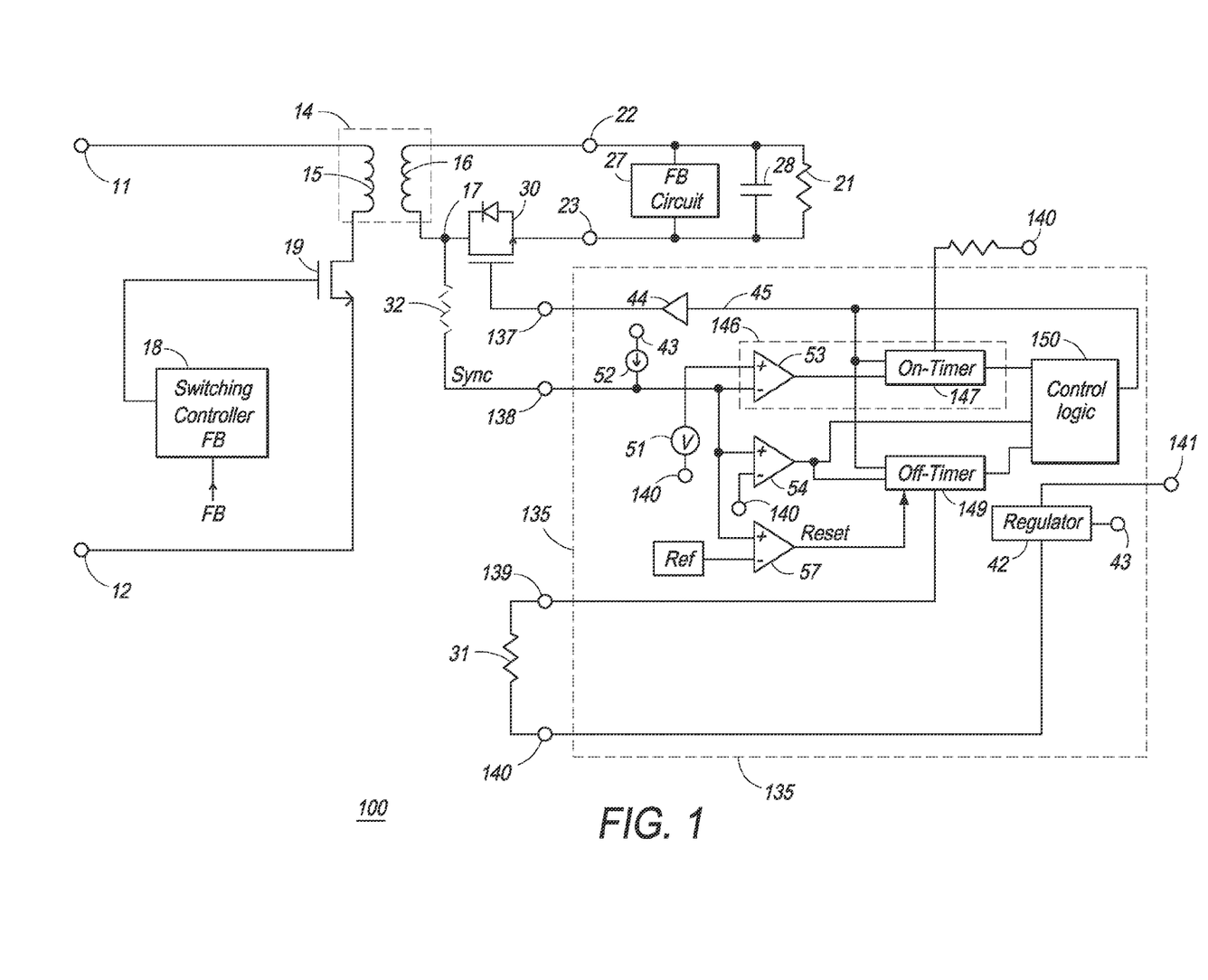
FIG. 1 schematically illustrates a portion of an example of an embodiment of a switching power supply system that includes a synchronous rectifier controller in accordance with the present invention.

FIG. 1 schematically illustrates a portion of an example of an embodiment of a switching power supply system 100 that includes a synchronous rectifier or transistor 30. System 100 typically includes a transformer 14 that has a primary winding 15 and a secondary winding 16 which configures system 100 with a primary side and a secondary side. System 100 typically receives power between an input terminal 11 and a common return terminal 12. A primary side switching controller 18 usually is configured to operate a primary side power switch 19 in order to regulate the value of an output voltage on the secondary side that is formed between an output 22 and a secondary side common return 23 to a target value. The output voltage is regulated to a target value within a range of values around the target value. For example, the target value may be five volts (5 v) and the range of values may be plus or minus five percent (5%) around the five volts. Controller 18 is configured to operate switch 19 to control current flow through a primary winding 15 of transformer 14 in order to regulate the value of the output voltage. Controller 18 typically includes a feedback (FB) input that receives a feedback signal from a feedback circuit 27. The feedback signal typically is representative of the value of the output voltage formed between output 22 and return 23.

The secondary side of system 100 typically includes a capacitor 28 that assists in filtering and forming the output voltage. A load 21 of system 100 is illustrated in a general manner by a resistor in order to simplify the drawings and descriptions. The secondary side also includes rectifier 30 and a synchronous rectifier controller 135.

Controller 135 typically is configured to receive operating power to operate the elements within controller 135 between a voltage input terminal 141 and a common voltage return terminal 140. A sync input 138 of controller 135 generally is configured to receive a sync signal from secondary winding 16. In the preferred embodiment, the value of the sync signal is also representative of the source-to-drain voltage of rectifier 30. Those skilled in the art will also understand that it is desirable to disable rectifier 30 when the value of the current from winding 16 is substantially zero and that the value and/or waveform of the sync signal can be used to determine the point at which the value of such current may be near zero. Those skilled in the art will also appreciate that common voltage return terminal 140 usually is connected to common return 23 to provide a common reference, such as a ground reference, for controller 135. In some embodiments controller 135 may also include an input that is connected to the source of rectifier 30 in order to allow controller 135 to monitor the value of the sync signal. For the example embodiment illustrated in FIG. 1, terminal 140 is substantially the same as the source of rectifier 30. In other embodiments, other elements may be in series between rectifier 30 and return 23. System 100 may also include an optional resistor 32 that may be used to modify the value of the sync signal voltage which may adjust the relationship between the threshold voltage of comparators 53-54 and 57 relative to the value of the voltage on node 17 or value of the voltage dropped across rectifier 30. Optional resistor 32 usually would be in series between input 138 and node 17.

Controller 135 typically includes a driver circuit or driver 44 that is configured to receive a switching signal 45 that is used to enable and disable rectifier 30. Driver 44 usually is a non-inverting driver with sufficient drive to supply the load of transistor 30. Driver 44 may be an inverting driver in other embodiments. Driver 44 provides switching signal 45 to an output 137 which generally is connected to a gate of rectifier 30. A control logic block or logic 150 is configured to assist in forming switching signal 45. Controller 135 also includes a first circuit that is configured to initiate enabling rectifier 30 responsively to the sync signal becoming a first value. In one embodiment, the first circuit includes an on-time control circuit 146 which also includes a comparator 53 and an on-timer 147. In some embodiments, circuit 146 may also include a first portion of logic 150 but may not include a portion of logic 150 in other embodiments. As will be seen further hereinafter, on-timer 147 is used to form a minimum time that the switching signal 45 is asserted, thus, forms a minimum on-time for rectifier 30. A second circuit of controller 135 is configured to initiate disabling rectifier 30 responsively to the sync signal becoming a second value. In one embodiment, the second circuit includes a comparator 54. In some embodiments, the second circuit may also include a second portion of logic 150 but may not include logic 150 in other embodiments. An off-time control circuit of controller 135 usually is configured to form an off-time interval of signal 45 responsively to the sync signal becoming a third value and is also configured to either extend the off-time interval or to reinitiate forming the off-time interval either prior to the off-time interval expiring or prior to the termination of the ringing, such as prior to a lowest voltage of the ringing being a positive value or the lowest voltage value of the ringing being greater than the first value. In one embodiment, the off-time control circuit includes a comparator 57 and a first timer or off-timer 149. In some embodiments, the off-time control circuit may also include a third portion of logic 150 but may not include logic 150 in other embodiments. As will be seen further hereinafter, the off-time control circuit is configured to form a minimum time that controller 135 controls rectifier 30 to be disabled, for example, form a minimum off-time for rectifier 30. In one embodiment, a current source 52 may be used to provide an off-set voltage to set a predetermined value for the threshold voltages of comparators 54 and 57. In other embodiments, source 52 may be omitted.

Controller 135 may also include a time set input 139 that may be used to set a predetermined value for one of the time intervals formed by the off-time control circuit. For example, a resistor 31 may be connected to input 139 and off-timer 149 may be configured so that the value of resistor 31 sets a period of time that is formed by off-timer 149. In one embodiment, the first period of time is chosen to be no less than a period of a frequency of the oscillations of the ringing. In other embodiments, the period of time may be formed in other ways such as by a digital timer where input 139 is used to set a digital value for the timer or as an analog value that off-timer 149 converts to a digital value. Controller 135 may also include an optional input that is used by on-timer 147 in a manner similar to the use of input 139 by off-timer 149.

In some embodiments controller 135 may include an optional internal regulator 42 that receives an input voltage on terminal 141 and provides an internal regulated voltage on an output 43 that is used for operating elements of controller 135 such as providing operating power to comparators 53-54 and 57, timers 147 and 149, and logic 150.

Figure 2:
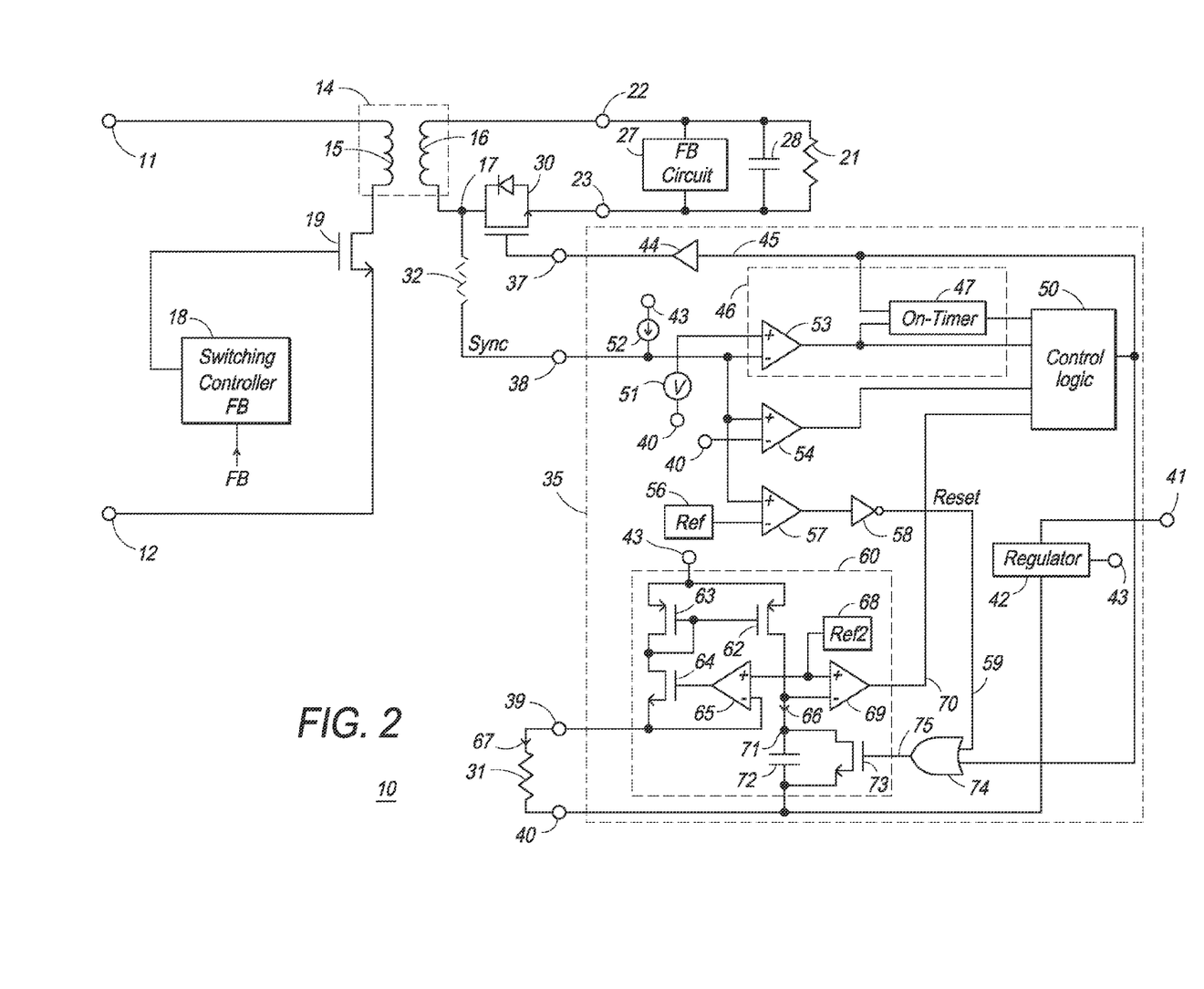
FIG. 2 schematically illustrates a portion of an example of an embodiment of another switching power supply system that includes a synchronous rectifier controller that is an alternate embodiment of the synchronous rectifier controller of FIG. 1 in accordance with the present invention.

FIG. 2 schematically illustrates a portion of an example of an embodiment of a switching power supply system 10 that is an alternate embodiment of system 100 described in the description of FIG. 1. System 10 includes an example of a portion of an embodiment of a synchronous rectifier controller 35 that is an alternate embodiment of controller 135 that was explained in the description of FIG. 1. Controller 35 includes an off-timer 60 that is an example of one embodiment of off-timer 149 that was explained in the description of FIG. 1. Inputs 38-41 of controller 35 are similar to inputs 138-141 of controller 135, and an output 37 is substantially similar to output 137 of controller 135. A control logic block or logic 50 of controller 35 is substantially similar to logic 150 of controller 135. An on-time control circuit 46 is substantially similar to on-time control circuit 146 of controller 135. Circuit 46 includes comparator 53 that monitors the voltage drop across rectifier 30. In another embodiment, comparator 53 may monitor the voltage on winding 16 at a terminal of winding 16, such as a node 17, that is connected to rectifier 30. Circuit 46 also includes an on-timer 47 that is substantially similar to on-timer 147 of controller 135.

Off-timer 60 includes a capacitor 72 that may be charged in order to form the off-time interval of off-timer 60. A current source of off-timer 60 is configured to form a current 66 to charge capacitor 72. In the preferred embodiment, the current source includes a voltage-to-current converter, configured as an amplifier 65 and a transistor 64, and a current mirror that includes transistors 62 and 63 connected in a current mirror configuration. A comparator 69 is used to determine when capacitor 72 is charged to a threshold value in order to provide a timing signal 70 indicating expiration of the off-time interval formed by off-timer 60. A reset transistor 73 is utilized to discharge capacitor 72.

Figure 3:
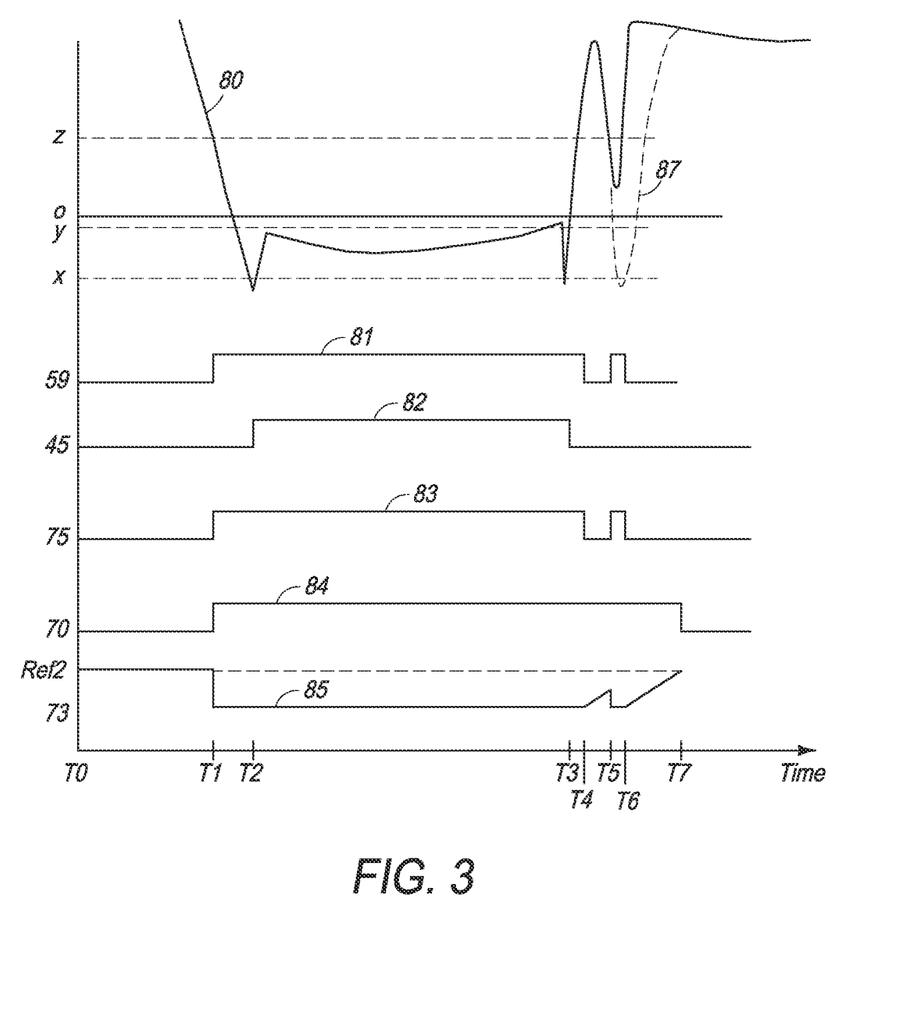
FIG. 3 is a graph having plots that illustrate some of the signals formed by the synchronous rectifier controller of FIG. 2 in accordance with the present invention.

FIG. 3 is a graph having plots that illustrate some of the signals formed by controller 35. The abscissa indicates time and the ordinate indicates increasing value of the illustrated signals. This description has references to FIG. 2 and FIG. 3. A plot 80 illustrates the value of the voltage on node 17. In another embodiment, plot 80 may illustrate the source-to-drain voltage of rectifier 30. A plot 81 illustrates a reset signal 59 that is formed by comparator 57 and an inverter 58. A plot 82 illustrates switching signal 45, and a plot 83 illustrates a pause signal 75 that is formed on an output of an OR gate 74. A plot 84 illustrates timing signal 70 of off-timer 60, and a plot 85 illustrates the voltage on capacitor 72, such as at a node 71.

In operation, the primary side switching controller 18 enables switch 19 in order to form a current flowing through winding 15 of transformer 14. Switching controller 18 subsequently disables switch 19 which interrupts the current flow through winding 15. Disabling switch 19 causes transformer 14 to couple energy into secondary winding 16 in order to form a current flowing through winding 16 to charge capacitor 28. Disabling switch 19 also causes the voltage on node 17 to abruptly become negative as illustrated by plot 80 between a time T0 and a time T1. On-time control circuit 46 is configured to monitor the voltage drop across rectifier 30, detect the value of the sync signal becoming coming a first value, for example decreasing to value X illustrated by plot 80 at time T2, and initiate enabling rectifier 30 responsively to the sync signal becoming the first value. In the preferred embodiment, the value X is just slightly negative, relative to return 23, but may be other values in other embodiments such as becoming a zero value for example. As the value of the voltage across rectifier 30 decreases past the value established at the non-inverting input of comparator 53 by a voltage reference 51, comparator 53 detects the first value of the sync signal and forms a control signal that is used by logic 50 to assert signal 45 and enable rectifier 30 as illustrated by plot 82 at time T2. On-timer 47 forms an on-time interval responsively to the value of the sync signal decreasing to the first value, and controller 35 is configured to assert signal 45 for at least the on-time interval formed by on-timer 47. This is sometimes referred to a minimum on-time for rectifier 30. Enabling rectifier 30 for at least the on-time interval reduces the effect of oscillations from secondary winding 16 that may be formed around time T2 as a result of enabling rectifier 30. In some embodiments, the off-time control circuit may be configured to ignore or blank the value of reset signal 59 prior to the asserted state of switching signal 45, such as between times T1-T2.

Controller 35 is configured to maintain the enable state of signal 45 until the voltage at node 17 increases to a second value, such as increasing to a value Y illustrated by plot 80 at a time T3. The value of the voltage at node 17 increasing to the second value may indicate that the energy in winding 16 is substantially dissipated and/or that the value of the secondary current is nearing zero. The second value typically is also a negative value but usually is less negative than the first value, thus, has a smaller magnitude. In other embodiments, the second value may have other voltage values such as being a positive value. As the value of the voltage drop across rectifier 30 becomes the second value, comparator 54 detects the second value of the sync signal and provides a control signal indicating that the second circuit should disable rectifier 30. The second circuit uses the control signal from comparator 54 and negates signal 45 to form a disable state of switching signal 45 and to disable rectifier 30 as illustrated at time T3.

Disabling rectifier 30 may result in ringing or oscillations at node 17 such as the examples illustrated by plot 80 between times T3 and T6. The off-time control circuit is configured to form an off-time interval and controller 35 is configured to prevent rectifier 30 from being re-enabled for at least this off-time interval. Between times T2-T3, the asserted state of signal 45 forces pause signal 75 on the output of OR gate 74 high which in turn enables transistor 73 to discharge capacitor 72 as illustrated by plots 83 and 85 at time T2. Transistor 73 remains enabled by signal 45 until signal 45 is negated near time T3. However, comparator 57 keeps reset signal 59 asserted, thus, transistor 73 remains enabled to discharge capacitor 72. Disabling rectifier 30 causes the sync signal to oscillate as illustrated between times T4-T6. As the value of the sync signal increases to a third value, such as the value illustrated as Z, comparator 57 changes state thereby disabling transistor 73. Disabling transistor 73 allows capacitor 72 to begin charging for a first period of time to the value represented by the voltage of Reference 2 or Ref2 68 as illustrated by plot 85 at time T3. Thus, the off-time control circuit initiates forming the off-time interval responsively to the sync signal becoming the third value, for example as a result of disabling rectifier 30, such as illustrated by plot 85 near time T4. Capacitor 72 continues to charge to form the off-time interval as illustrated by plot 85 between time T4 and T5. Logic 50 uses the off-time interval to substantially prevent re-asserting signal 45, thus, to substantially prevent re-enabling rectifier 30 by controller 35, for at least the off-time interval in order to reduce the effects of oscillations around the time of disabling rectifier 30. In some cases, oscillations may occur prior to expiration of the first period of time formed by off-timer 60. For example, the ringing near time T3-T6 could have multiple transitions that go below the first value (for example value X), such as illustrated by a dashed line 87. Prior art circuits allow the re-enabling rectifier 30 as a result of this ringing, however, this would reduce the efficiency of a power supply system. Therefore, the off-time control circuit of controller 35 is configured to restart forming the off-time interval responsively to the sync signal becoming a third value, for example decreasing to the value Z in plot 80 after previously increasing to the third value. Those skilled in the art will appreciate that in some embodiments comparator 57 may have some hysteresis such that the first transition of the sync signal increasing to third value may be detected at a slightly different value from the second transition of the sync signal decreasing to third value. In the preferred embodiment, the third value is a positive value that is more positive than the first and second values. In other embodiments, the third value may be less positive or even a negative value. In the preferred embodiment, it is desirable to have the magnitude of the third value to be greater than the magnitude of either of the first or second values. Comparator 57 of the off-time control circuit detects the value of the sync signal becoming the third value subsequently to the disable state of signal 45, for example decreasing to the value Z, and asserts reset signal 59, through an inverter 58, as illustrated by plot 81 at a time T5. Asserting reset signal 59 again enables transistor 73 to discharge capacitor 72 as illustrated by plot 85 at time T5. The value of the sync signal subsequently increases past the third value as illustrated by plot 80 at a time T6 thereby again negating reset signal 59 and disabling transistor 73. Disabling transistor 73 allows capacitor 72 to again begin charging, as illustrated by plot 85 at time T6, thus, to restart forming the off-time interval or to extend the off-time interval. From the foregoing, those skilled in the art will appreciate that controller 35 is configured to restart forming the off-time interval or extend the off-time interval prior to expiration of the first time period, for example a time period that is formed by at least a portion of a time needed for an uninterrupted charging of capacitor 72 toward Ref2 68 by current 66 or prior to the termination of the ringing.

For the example illustrated in FIGS. 2-3, the sync signal does not again transition to less than the third value, thus, after time T6 capacitor 72 continues to charge. Comparator 69 detects capacitor 72 charging to Ref2 68 and asserts timing signal 70 to indicate expiration of the off-time interval near time T7. For the example embodiment illustrated in FIG. 2, timing signal 70 is asserted by the output of comparator 69 going low (negative logic for this example, but may be positive logic in other embodiments). Controller 35 is configured to allow the re-enabling of rectifier 30 subsequently to expiration of the off-time interval including expiration of restarting or extending the off-time interval.

For other example applications, if the ringing continued after time T5 and again transitioned to less than the third value, controller 35 is configured to again detect the sync signal becoming the third value and to again restart forming the off-time interval or to extend the off-time interval.

The voltage to current converter formed by amplifier 65 and transistor 64 receives the voltage from Ref2 68 and forms a current 67 that flows through resistor 31. The value of current 67 is sufficient to maintain input 39 at the voltage formed by Ref2 68. Current 67 also flows through transistor 63 of the current mirror formed by transistors 62 and 63. The value of current 66 used to charge capacitor 72 is ratioed to the value of current 67 by the ratio of the current mirrors transistor 62 and 63. The value of current 66, thus the time interval of the first period of time, can be set by choosing a value for resistor 31. The smaller the value of resistor 31, the larger the value of current 66 and the shorter the time interval of the first period of time. Those skilled in the art will appreciate that once a value is chosen for resistor 31, it merely sets a predetermined fixed time interval.

In order to provide the above described functionality for controller 35, an inverting input of comparator 53 is commonly connected to a non-inverting input of amplifiers 54 and 57 and to sync input 38. Sync input 38 is configured to be connected to a drain of rectifier 30. A non-inverting input of comparator 53 is connected to a first terminal of reference 51 which has a second terminal connected to return 40. An inverting input of comparator 54 is connected to receive a reference voltage, such as a reference voltage from terminal 40. An inverting input of comparator 57 is connected to receive the value of Ref1 from an output of Ref1 56. An output of comparator 53 is connected to a first input of logic 50 and to a first input of on-timer 47. An output of on-timer 47 is connected to a second input of logic 50. A second input of on-timer 47 is commonly connected to receive switching signal 45 from an output of controller logic 50 and to a first input of OR gate 74. An output of comparator 54 is connected to a third input of logic 50. An output of comparator 57 is connected to an input of inverter 58 which has an output connected to a second input of gate 74. An output of gate 74 is connected to a gate of transistor 73. A source of transistor 73 is commonly connected to a first terminal of capacitor 72 and to return terminal 40. A second terminal of capacitor 72 is commonly connected to a drain of transistor 62 and to an inverting input of comparator 69. A non-inverting input of comparator 69 is connected to an output of Ref2 68 and to a non-inverting input of amplifier 65. An output of comparator 69 is connected to a fourth input of logic 50. An inverting input of amplifier 65 is commonly connected to input 39 and to a source of transistor 64. An output of amplifier 65 is connected to a gate of transistor 64. A drain of transistor 64 is commonly connected to a drain and gate of transistor 63 and to a gate of transistor 62. A source of transistor 63 is commonly connected to a source of transistor 62 and to output 43 of regulator 42. An output of driver 44 is connected to output 37 which is configured to be connected to a gate of rectifier 30. Voltage input 41 is connected to an input of regulator 42 which has a common terminal connected to terminal 40.

Figure 4:
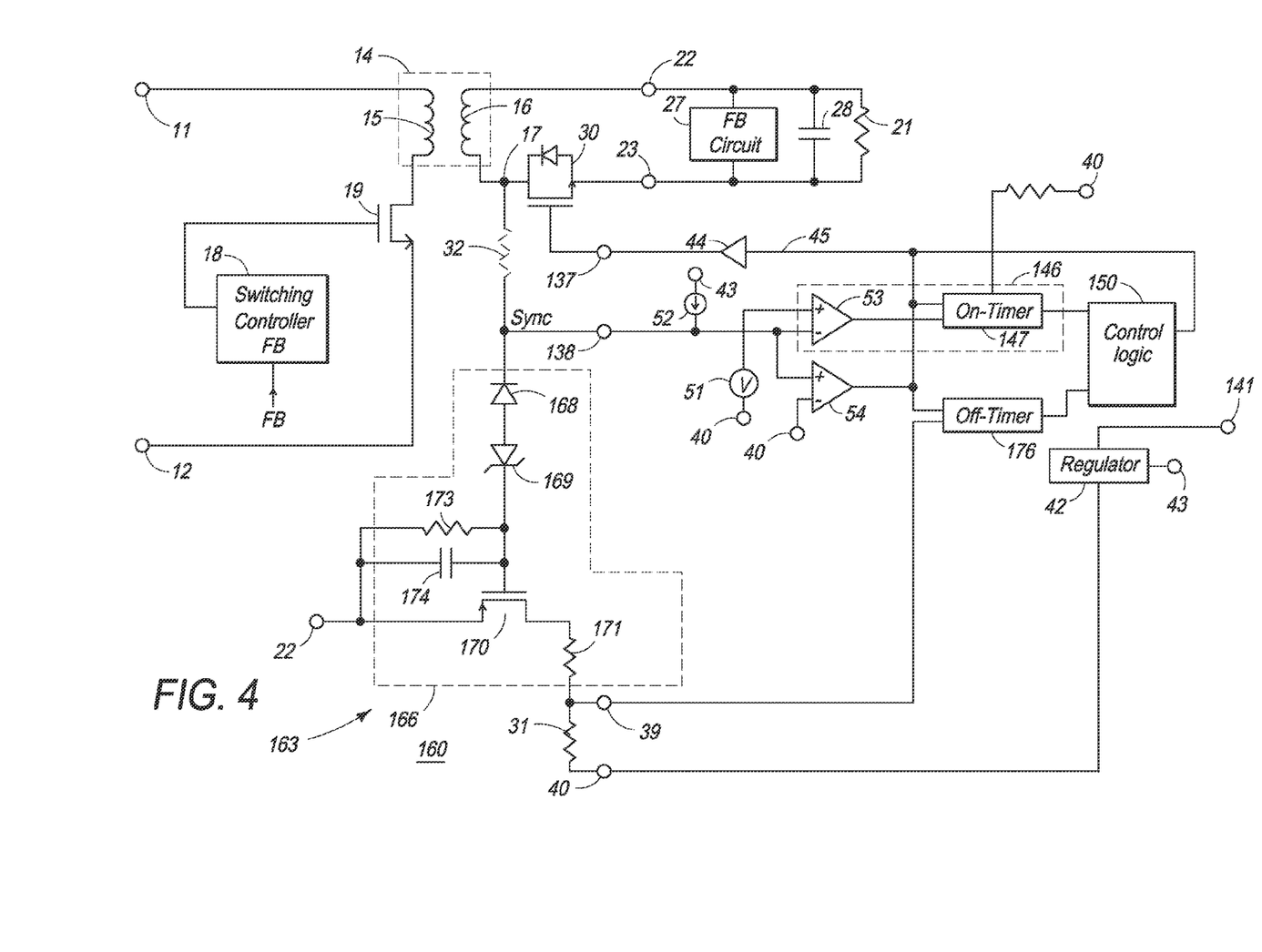
FIG. 4 schematically illustrates an example of an embodiment of a portion of another switching power supply system that includes another synchronous rectifier controller that is an alternate embodiment of the synchronous rectifier controllers of FIG. 1 and FIG. 2 in accordance with the present invention.

FIG. 4 schematically illustrates an example of an embodiment of a portion of a switching power supply system 160 that is an alternate embodiment of system 100 and system 10 that were explained in the descriptions of FIG. 1 and FIGS. 2-3. System 160 is similar to system 100 except that system 160 includes a synchronous rectifier controller 163 that is an alternate embodiment of controller 135 that was explained in the description of FIG. 1. Controller 163 is similar to controller 135 except that controller 163 includes an off-time control circuit that includes an off-timer 176 and a reset circuit 166.

Off-timer 176 is configured to initiate forming the off-time interval for a first period of time responsively to negating signal 45 to initiate disabling rectifier 30. Reset circuit 166 is configured to increase the first period of time formed by off-timer 176 responsively to the sync signal becoming the third value either prior to termination of the first period of time or prior to the termination of the ringing. As can be seen, reset circuit 166 detects the sync signal becoming the third value, increases the first period of time responsively to the sync signal becoming the third value, and then re-enables forming the off-time interval.

In operation, assume that rectifier 30 is enabled and that the value of the sync signal is increasing such as illustrated near time T3 in FIG. 3. Comparator 54 detects the sync signal increasing to the second value, such as the value illustrated in plot 80, and provides a control signal that is used by logic 150 to negate signal 45. Off-timer 176 initiates forming the off-time interval responsively to the negated state of signal 45. Reset circuit 166 is configured to detect the sync signal becoming the third value and to pause timer 176 to increase the off-time interval.

Circuit 166 includes a diode 168, a zener diode 169 that is used as to form a reference voltage, and a transistor 170 that is configured to control the operation of off-timer 176. As the value of the sync signal decreases to a value that is less than a threshold voltage established by the voltage of zener diode 169, the voltage drop of diode 168, and the threshold voltage of transistor 170, transistor 170 becomes enabled. Enabling transistor 170 couples the value of the voltage on input 139 to substantially the voltage received on input terminal 141 or to some voltage that is high enough to pause off-timer 176. For example, a voltage this is higher than the voltage applied to input 139 by off-timer 176. Enabling transistor 170 applies the high voltage to input 139 and causes off-timer 176 to suspend timing out the first period of time thereby increasing the off-time interval. In one example embodiment, off-timer 176 charges a capacitor to form the first time interval. In this example embodiment, enabling transistor 170 substantially stops current from flowing into the capacitor thereby pausing the charging of the capacitor, thus, increasing the first period of time and increasing the off-time interval.

As the value of the sync voltage continues to increase, such as after time T6 (FIG. 3), the value of the voltage applied to the gate of transistor 170 becomes large enough to prevent enabling transistor 170. A resistor 173 and a capacitor 174 form an RC network that controls the time required to disable transistor 170. In the preferred embodiment, the time constant of the RC network is chosen to be no less than a frequency of the ringing. The time constant may be other values in other embodiments. The time constant delays turning off transistor 170 for a period of time. In one embodiment, the time constant delays turning off transistor 170 for at least the period of the frequency of the ringing. Disabling transistor 170 disables circuit 166 thereby allowing off-timer 176 to continue forming the off-time interval from the point it was prior to the increased time formed by circuit 166.

In one embodiment, off-timer 176 may be a portion of an integrated circuit controller and circuit 166 may be external to the integrated circuit. For example, off-timer 176 may be a portion of an NCP4303 manufactured by Semiconductor Components Industries, LLC (SCILLC) of Phoenix, Ariz. (DBA ON Semiconductor), and circuit 166 may be external to the NCP4303.

In one embodiment, off-timer 176 may include a current source and capacitor that may be substantially similar to the FIG. 2 capacitor 72, voltage-to-current converter of amplifier 65 and transistor 64, the current mirror of transistors 62-63.

In order to facilitate this functionality for controller 163, a source of transistor 170 is commonly connected to output 22, a first terminal of capacitor 174 and a first terminal of resistor 173. A gate of transistor 170 is commonly connected to a second terminal of capacitor 174, a second terminal of resistor 173, and to a cathode of diode 169. An anode of diode 169 is connected to an anode of diode 168. A cathode of diode 168 is connected to input 138, to node 17, and to the drain of rectifier 30.

Figure 5:
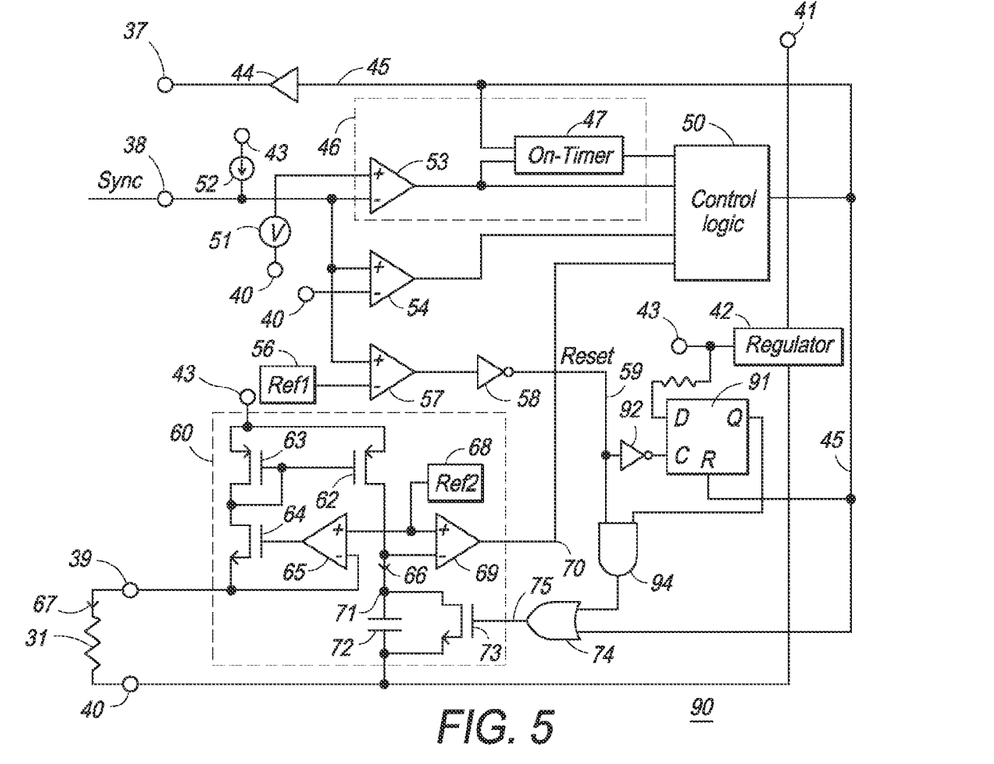
FIG. 5 schematically illustrates an example of an embodiment of a portion of another synchronous rectifier controller that is an alternate embodiment of the synchronous rectifier controllers of FIG. 1, FIG. 2, and FIG. 4 in accordance with the present invention.

FIG. 5 schematically illustrates an example of an embodiment of a portion of a synchronous rectifier controller 90 that is an alternate embodiment of controllers 35, 135, and 136 that were explained in the description of FIGS. 1-4. Controller 90 is similar to controller 35 except that controller 90 includes an off-time control circuit that is configured to initiate forming an off-time interval for a first period of time responsively to controller 90 initiating a disable state of rectifier 30 wherein controller 90 is configured to maintain rectifier 30 in the disable state for at least the off-time interval. The off-time control circuit is also configured to restart forming the off-time interval responsively to the sync signal becoming the third value prior to expiration of the first time period.

The off-time control circuit of controller 90 includes a D-type flip-flop or F-flop 91, an inverter 92, and an AND gate 94.

Figure 6:
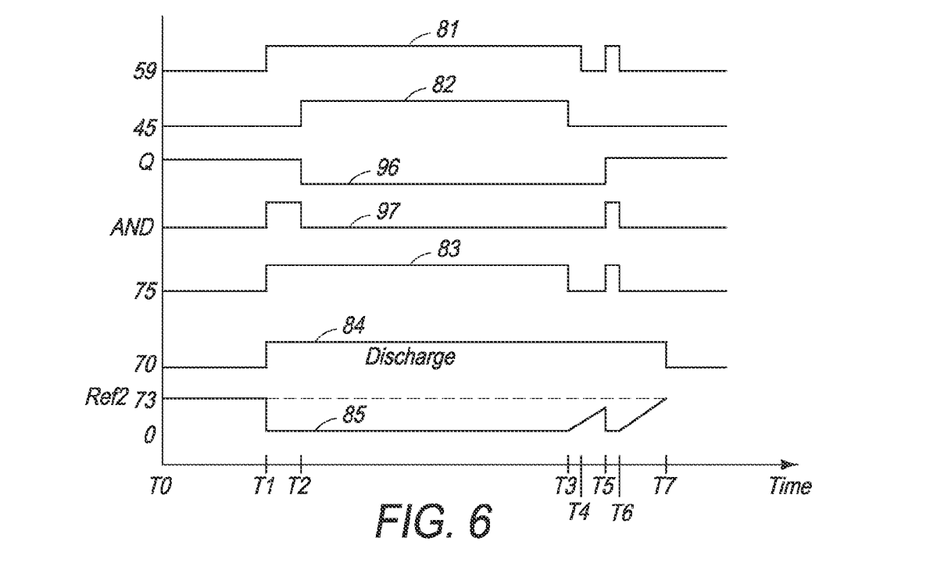
FIG. 6 is a graph having plots that illustrate some of the signals formed by the synchronous rectifier controller of FIG. 5 in accordance with the present invention.

FIG. 6 is a graph having plots that illustrate some of the signals formed by controller 90. The abscissa indicates time and the ordinate indicates increasing value of the illustrated signals. This description has references to FIGS. 3, 5, and FIG. 6. A plot 96 illustrates a Q output of F-flop 91, and a plot 97 illustrates an output of gate 94.

In operation, signal 45 holds F-flop 91 reset while signal 45 is asserted to enable rectifier 30 (FIG. 2). The reset state of F-flop 91 negates the output of gate 94 to prevent reset signal 59 from affecting pause signal 75. As controller 90 negates signal 45 to disable rectifier 30, such as at time T3, the output of gate 74 remains negated regardless of the state of reset signal 59. Therefore, controller 90 begins forming the first period of time of the off-time interval responsively to controller 90 initiating the disable state of rectifier 30. At time T4, the sync signal increases to the third value, such value Z, which asserts signal 59. The edge of signal 59 clocks a high level into F-flop 91. The high Q output allows signal 59 to assert signal 75 and discharge capacitor 72. Subsequently at time T6, the sync signal increases past the third value (FIG. 3) and the resulting negated state of reset signal 59 results in negating signal 75 to again charge capacitor 72. Thus, the off-time control circuit increases the off-time interval or also can be viewed to restart the off-time interval prior to expiration of the first period of time.

Figure 7:
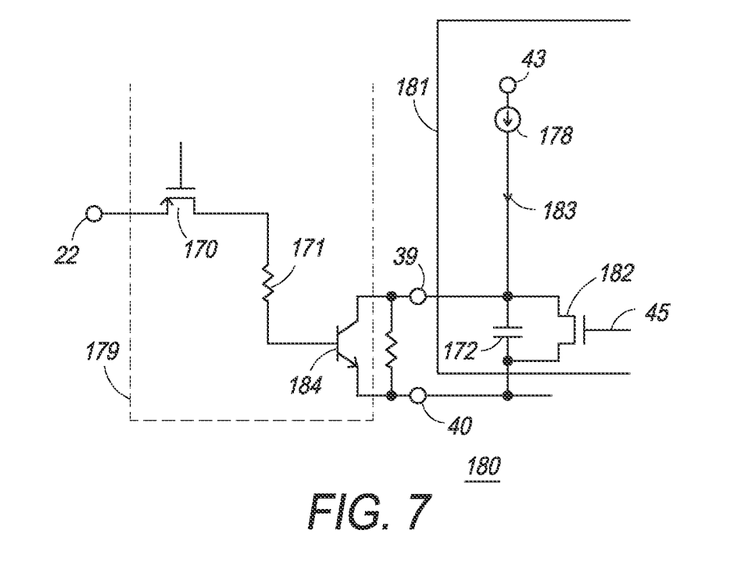
FIG. 7 schematically illustrates an embodiment of an off-time control circuit that is an alternate embodiment of an off-time control circuit described in the description of FIG. 4.

FIG. 7 schematically illustrates an embodiment of an off-time control circuit 180 that is an alternate embodiment of the off-time control circuit described in the description of FIG. 4. Off-time control circuit 180 includes an off-timer 181 that is an alternate embodiment of timer 176 (FIG. 4). Off-timer 181 includes a current source 178 that is used to charge a capacitor 172 in order to form the first period of time of the off-time interval. A transistor 182 is used to discharge capacitor 172, for example discharging capacitor 172 while rectifier 30 is enabled. Off-time control circuit 180 also includes a reset circuit 179 that is an alternate embodiment of circuit 166 (FIG. 4). Circuit 179 includes an additional transistor 184. Although transistor 184 is illustrated as a bipolar transistor, it may be an MOS transistor or another type of switch element in other embodiments.

Assuming that transistor 182 is disabled, a current source 178 provides a current 183 to charge capacitor 172. As reset circuit 179 enables transistor 170, transistor 170 enables transistor 184 to discharge capacitor 172 thereby increasing the first period of time to a second period of time. Subsequently disabling transistor 170 also disables transistor 184 and allows source 178 to again generate current 183 to charge capacitor 172. It can therefore be seen that reset circuit 179 increases the off-time interval by resetting and subsequently re-enabling the charging of capacitor 172.

Those skilled in the art will appreciate that a current source such as current source 178 may also be used as a current source for charging capacitor 72 that is described in the description of FIG. 2 instead of the current mirror and/or the voltage-to-current converter.

Figure 8:
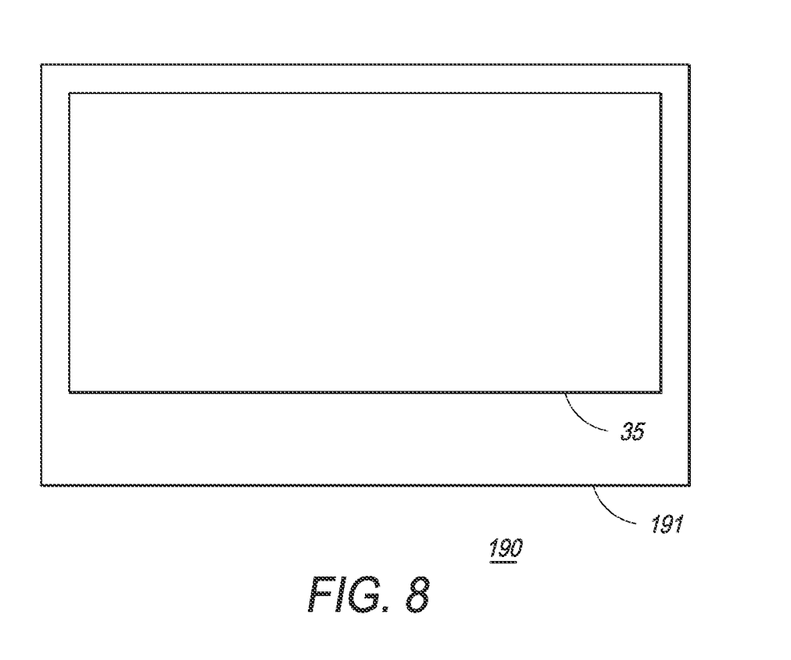
FIG. 8 illustrates an enlarged plan view of a semiconductor device that includes the synchronous rectifier controller of one of FIGS. 1, 2, 4, and 5, in accordance with the present invention.

FIG. 8 illustrates an enlarged plan view of a portion of an embodiment of a semiconductor device or integrated circuit 190 that is formed on a semiconductor die 191. Any of controllers 35, 135, or 163 or portions thereof may be formed on die 191. Die 191 may also include other circuits that are not shown in FIG. 6 for simplicity of the drawing. The controller and device or integrated circuit 190 are formed on die 191 by semiconductor manufacturing techniques that are well known to those skilled in the art.

Those skilled in the art will appreciate that in one embodiment, a synchronous rectifier controller may comprise: a control circuit, for example driver 44 and/or a portion of circuit 50, configured to form a switching signal with an enable state to enable a synchronous rectifier and with a disable state to disable the synchronous rectifier;

a sync input configured to receive a sync signal that is representative of a voltage drop across the synchronous rectifier;

a first circuit, circuit 47 for example, configured to initiate the enable state of the switching signal responsively to the sync signal becoming a first value;

a second circuit, for example comparator 54 and/or a portion of circuit 50, configured to initiate the disable state of the switching signal responsively to the sync signal becoming a second value that is greater than the first value;

an off-time control circuit, such as comparator 57 and circuit 60 or circuit 166, having a first timer circuit that is configured to initiate forming an off-time interval for a first period of time wherein the control circuit maintains the switching signal in the disable state for at least the off-time interval; and the off-time control circuit configured to restart forming the off-time interval responsively to the sync signal becoming a third value prior, such as value Z, to expiration of the first time period.

In another embodiment, the synchronous rectifier controller may also include that the off-time control circuit maintains the switching signal in the disable state for at least the off-time interval subsequently to forming the disable state of the switching signal, such as maintains the disabled state for at least the off-time interval.

Another embodiment of the synchronous rectifier controller may also include that the off-time control circuit initiates forming the off-time interval responsively to one of the disable state of the switching signal or the sync signal becoming the third value, for example decreases to Z at time T4.

Those skilled in the art will also understand that one embodiment of a method of forming a synchronous rectifier controller may comprise:

configuring the synchronous rectifier controller to initiate disabling a synchronous rectifier responsively to a voltage on a winding of a transformer that is coupled to the synchronous rectifier becoming a first value;

configuring an off-time control circuit, for example circuit 66 and comparator 57 or circuit 166 and timer 176 or the off-time control circuit of controller 90, to form an off-time interval for a first period of time wherein the synchronous rectifier controller maintains the switching signal in the disable state for at least the off-time interval; and configuring the off-time control circuit to increase the off-time interval by increasing the first period of time to a second period of time responsively to the voltage becoming a different value, for example value Z, prior to termination of ringing of the voltage, such as prior to the end of oscillations after time T3.

In another embodiment, the method may include, configuring the off-time control circuit to form the off-time interval responsively to one of initiating disabling the synchronous rectifier, initiating the disable state of signal 45, or responsively to a second value of the voltage on the winding of the transformer, for example value Z after time T3.

In another embodiment, the method may include changing a digital value used to form the first period of time.

Another embodiment of the method may include, configuring the off-time control circuit to increase the off-time interval prior to expiration of the first period of time, such as prior to the voltage on capacitor 72 reaching the value of Ref2.

Another embodiment of the method may include, configuring the off-time control circuit to restart forming the first period of time prior to the expiration of the first period of time, for example restart charging capacitor 72 prior to reaching Ref2.

Those skilled in the art will also appreciate that a method of forming a synchronous rectifier controller may comprise:

configuring the synchronous rectifier controller to initiate a disable state a synchronous rectifier, such as negating signal 45, responsively to a voltage of the synchronous rectifier becoming a first value;

configuring an off-time control circuit to form an off-time interval, such as at least a portion of the interval needed to charge capacitor 72 to value Ref2, responsively to the first value of the voltage; and configuring the off-time control circuit to one of increase the off-time interval or reinitiate forming the off-time interval prior to termination of ringing of the voltage wherein the synchronous rectifier controller maintains the switching signal in the disable state for at least a portion of the off-time interval.

In another embodiment, the method may also include, configuring the off-time control circuit to form a first period of time, such as the time between T3 and T5, responsively to the first value of the voltage and to form a second period of time, such as the time between T5 and T7, responsively to a second value of the voltage wherein the off-time interval continues until expiration of both the first and the second time periods of time.

Another embodiment of the method may also include, configuring the off-time control circuit to form a first period of time and to one of increase the first period of time to a second period of time, such as increase as by circuit 166 or increase between time T3 to T7, or reinitiate forming the first period of time, such as between time T5 to T7, prior to termination of the ringing of the voltage, such as prior to the sync signal voltage no longer going below value Z.

Those skilled in the art will appreciate that in another embodiment, a synchronous rectifier controller may comprise: an enable means for enabling a synchronous rectifier for at least a first period of time;

a disable means for disabling the synchronous rectifier for a first period of time responsively to a first voltage value, for example value Y, of the synchronous rectifier; and a means, for example the off-time control circuit, to either restart the first period of time, such as comparator 57 and off-timer 60, or to extend the first period of time for a second period of time, for example the time signal 59 is asserted, responsively to a second voltage value of the synchronous rectifier.

In another embodiment, the synchronous rectifier controller may also include a means to terminate the second period of time, for example either comparator 57 negating signal 59 or circuit 166 disabling transistor 170, responsively to the voltage of the synchronous rectifier again reaching the second voltage value.

In view of all of the above, it is evident that a novel device and method is disclosed. Included, among other features, is forming a synchronous rectifier controller to disable a synchronous rectifier for a first time interval in response to a voltage of the synchronous rectifier becoming a first value, value greater than Z for example, and to restart forming the first time interval or to extend the first time interval in response to the voltage of the synchronous rectifier again becoming the first value, less than value Z for example. Configuring the controller to keep the synchronous rectifier disabled for the time formed by restarting or extending the first time interval minimizes the effect of ringing on the system that uses the synchronous rectifier controller and also improves the efficiency of the system.

While the subject matter of the descriptions are described with specific preferred embodiments and example embodiments, the foregoing drawings and descriptions thereof depict only typical and example embodiments of the subject matter and are not therefore to be considered to be limiting of its scope, it is evident that many alternatives and variations will be apparent to those skilled in the art. As will be appreciated by those skilled in the art, the example forms of systems 10, 100, and 160 and controllers 35, 135, 163, and 180 are used as a vehicle to explain the operation method of restarting formation of the first time interval or extending the first time interval. Although the controllers are illustrated in a flyback power supply system application, the controllers may be used in various other well-known types of power supply systems. Although rectifier 30 is illustrated in one leg of secondary winding 16, it may be in the opposite leg or may be in primary side of the system. Those skilled in the art will also appreciate the other detector circuits may be used to detect the first, second, and third values instead of comparators 53-54 and 57. For example, a transistor that is properly biased could also be used as a detector to detect a certain voltage value, thus three different transistors used for the three different values. Although the value of the sync signal is described as being detected by analog comparators, the value may be detected by using digital techniques such as converting the value to a digital number such as with an analog-to-digital converter, and then determining the magnitude of the digital number. Those skilled in the art will appreciate that the alternatives described for any of FIGS. 1-5 may also apply to any other of the drawings. One skilled in the art will understand that the drawings described herein are only schematic and are non-limiting, and that the size of some of the elements may be exaggerated and not drawn on scale for illustrative purposes. The dimensions and the relative dimensions may not correspond to actual reductions to practice of the invention. Further, the polarities of any of the signals may be changed with appropriate changes in the associated logic or polarities of other signals.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A synchronous rectifier controller comprising:
a control circuit configured to form a switching signal with an enable state to enable a synchronous rectifier and with a disable state to disable the synchronous rectifier;
a sync input configured to receive a sync signal that is representative of a voltage drop across the synchronous rectifier;
a first circuit configured to initiate the enable state of the switching signal responsively to the sync signal becoming a first value;
a second circuit configured to initiate the disable state of the switching signal responsively to the sync signal becoming a second value that is greater than the first value;
an off-time control circuit having a first timer circuit that is configured to initiate forming an off-time interval for a first period of time wherein the control circuit maintains the switching signal in the disable state for at least the off-time interval; and
the off-time control circuit configured to restart forming the off-time interval responsively to the sync signal becoming a third value prior to expiration of the first time period.

2. The synchronous rectifier controller of claim 1 wherein the off-time control circuit maintains the switching signal in the disable state for at least the off-time interval subsequently to forming the disable state of the switching signal.

3. The synchronous rectifier controller of claim 1 wherein the off-time control circuit initiates forming the off-time interval responsively to one of the disable state of the switching signal or the sync signal becoming the third value.

4. The synchronous rectifier controller of claim 1 wherein the first circuit includes an on-time control circuit having a second timer circuit that is configured to initiate forming an on-time interval for a second period of time responsively to the control circuit forming the enable state of the switching signal wherein the control circuit maintains the switching signal in the enable state for approximately the second period of time.

5. The synchronous rectifier controller of claim 4 wherein the second circuit initiates the disable state responsively to the sync signal increasing to the second value.

6. The synchronous rectifier controller of claim 4 wherein the first timer circuit includes a current source configured to form a current to charge a capacitor and wherein the off-time control circuit includes a transistor configured to reduce the value of the current.

7. The synchronous rectifier controller of claim 6 further including, the off-time control circuit configured to enable the transistor responsively to the sync signal becoming the third value prior to expiration of the first time period.

8. A method of forming a synchronous rectifier controller comprising:
configuring the synchronous rectifier controller to initiate disabling a synchronous rectifier responsively to a voltage on a winding of a transformer that is coupled to the synchronous rectifier becoming a first value;
configuring an off-time control circuit to form an off-time interval for a first period of time wherein the synchronous rectifier controller maintains the switching signal in the disable state for at least the off-time interval; and
configuring the off-time control circuit to increase the off-time interval by increasing the first period of time to a second period of time responsively to the voltage becoming a different value prior to termination of ringing of the voltage and prior to expiration of the off-time interval.

9. The method of claim 8 wherein configuring the off-time control circuit to form the off-time interval includes configuring the off-time control circuit to form the off-time interval responsively to one of initiating disabling the synchronous rectifier or responsively to a second value of the voltage on the winding of the transformer.

10. The method of claim 8 wherein increasing the first period of time to the second period of time includes configuring a first timer to change a value of a current used to change a voltage on a capacitor.

11. The method of claim 10 wherein configuring the first timer to change the value of the current includes configuring the first timer to decrease the value of the current to substantially zero.

12. The method of claim 8 wherein increasing the first period of time to the second period of time includes configuring a first timer to discharge a capacitor responsively to the voltage becoming the different value prior to expiration of the first time period.

13. The method of claim 8 wherein configuring the off-time control circuit to increase the off-time interval includes configuring the off-time control circuit to increase the off-time interval prior to expiration of the first period of time.

14. The method of claim 8 wherein configuring the off-time control circuit to increase the off-time interval by increasing the first period of time to the second period of time includes configuring the off-time control circuit to restart forming the first period of time prior to the expiration of the first period of time.

15. The method of claim 8 wherein configuring the off-time control circuit to increase the off-time interval by increasing the first period of time to the second period of time includes configuring the off-time control circuit to restart forming the first period of time subsequent to the expiration of the first period of time and prior to termination ringing of the voltage.

16. A method of forming a synchronous rectifier controller comprising:
configuring the synchronous rectifier controller to initiate a disable state a synchronous rectifier responsively to a voltage of the synchronous rectifier becoming a first value;
configuring an off-time control circuit to form an off-time interval responsively to the first value of the voltage; and
configuring the off-time control circuit to one of increase the off-time interval or reinitiate forming the off-time interval prior to termination of ringing of the voltage and prior to expiration of the off-time interval wherein the synchronous rectifier controller maintains the switching signal in the disable state for at least a portion of the off-time interval.

17. The method of claim 16 wherein configuring the off-time control circuit to one of increase the off-time interval includes configuring the off-time control circuit to form a first period of time responsively to the first value of the voltage and to form a second period of time responsively to a second value of the voltage wherein the off-time interval continues until expiration of both the first and the second time periods of time.

18. The method of claim 16 wherein configuring the synchronous rectifier controller to initiate disabling the synchronous rectifier responsively to the voltage of the synchronous rectifier includes configuring the synchronous rectifier controller to initiate disabling the synchronous rectifier responsively to a voltage across the synchronous rectifier becoming the first value.

19. The method of claim 16 wherein configuring the off-time control circuit to one of increase the off-time interval or reinitiate forming the off-time interval includes configuring the off-time control circuit to form a first period of time and to one of increase the first period of time to a second period of time or reinitiate forming the first period of time prior to termination of the ringing of the voltage.

20. The method of claim 19 further including configuring the off-time control circuit to one of increase the first period of time to a second period of time prior to expiration of the first period of time or to reinitiate forming the first period of time prior to expiration of the first period of time.

* * * * *